Jan. 19, 1965 M. BELTOISE 3,165,767
PROCESS FOR THE MANUFACTURE OF DEFORMABLE SELF-LOCKING NUTS
Filed Dec. 27, 1962 2 Sheets-Sheet 1

United States Patent Office 3,165,767
Patented Jan. 19, 1965

3,165,767
PROCESS FOR THE MANUFACTURE OF DEFORMABLE SELF-LOCKING NUTS
Maurice Beltoise, Paris, France, assignor to Société en nom collectif dite Beltoise Marguet & Cie, Suresnes-Seine, France, a French society
Filed Dec. 27, 1962, Ser. No. 247,564
3 Claims. (Cl. 10—86)

This invention relates to a process for the manufacture of deformable self-locking nuts.

In French Patent No. 1,257,688 there is described a deformable self-locking nut comprising a tapped barrel and a skirt coaxially surrounding this barrel, the thickness of the barrel being substantially greater than that of the skirt. In the aforementioned patent it was stated that such a nut could be produced by pressure-shaping in accordance with a conventional technique. However it was realised that the conventional process of pressure-shaping possessed numerous drawbacks, which it was necessary to remedy in order to obtain nuts of the aforementioned type, of good quality.

First of all the process which is used at present for the manufacture of such nuts will be described to illustrate the drawbacks of this process. For this purpose reference will be made to the accompanying drawings, wherein.

Figure 1A:
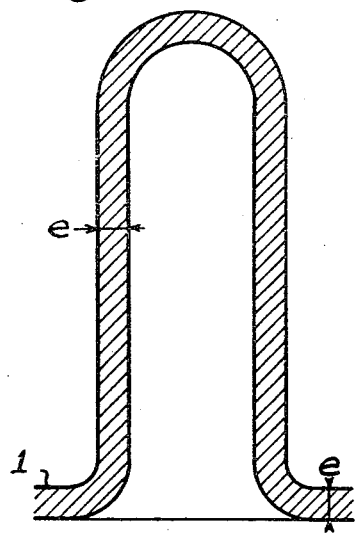
FIGURES 1a, 1b, 1c, 1d, 1e represent the different phases of the production of the self-locking lock-nut shown in FIGURE 1.
Figure 1B:
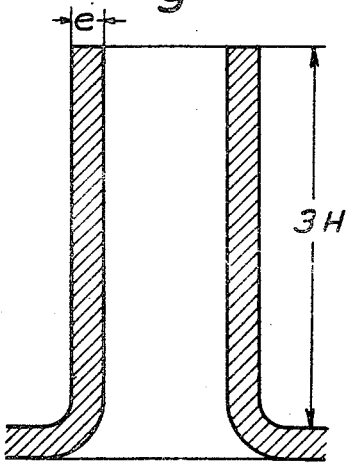
Figure 1C:
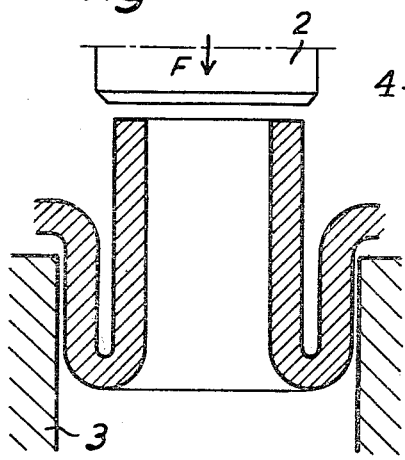
Figure 1D:
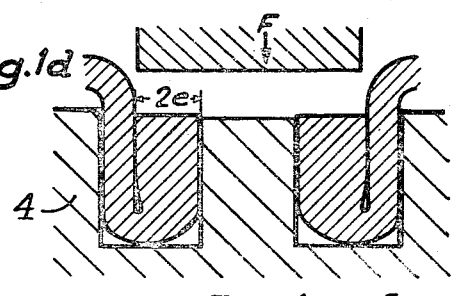
Figure 1E:
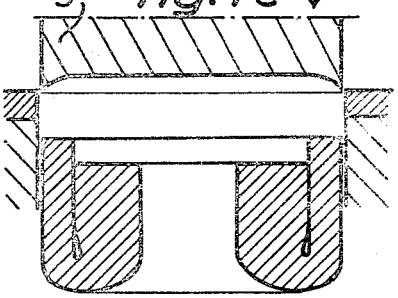
Figure 1:
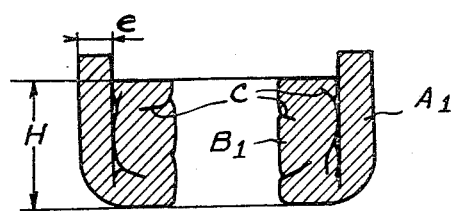
FIGURE 1 is a sectional view of a nut made by the prior art process.

Referring to the drawing, it is seen that the process started with the employment of a metal plate or strip 1, the initial thickness e of which was equal to the final thickness of the skirt shown at $A_1$ in FIGURE 1. In the course of one or more pressure-shaping operations the plate was deformed so that the blank shown in FIGURE 1a, and then that shown in FIGURE 1b, were obtained. In the latter the height of the blank was substantially equal to three times the height H of the barrel $B_1$ shown in FIGURE 1.

Next as shown in FIGURE 1c a force directed in the direction of the arrow F was exerted with the aid of an appropriate punch 2 upon the blank resting on a die 3. In the course of this operation the skirt was deformed and brought into its final shape. It should be noted that in the three phases represented diagrammatically in FIGURES 1a, 1b and 1c the thickness of the initial metal plate or strip was not varied and that consequently at the end of the phase 1c the skirt has reached its practically final shape.

Then as represented in FIGURE 1d a force directed in the direction of the arrow F was exerted upon the central part of the blank, while it rested in a die 4 preventing it from moving downwards. Under these conditions the central part of the blank could be crushed and its thickness was increased to a value approximately twice the thickness of the initial metal plate or strip. This central part constituted the barrel of the nut as represented at $B_1$ in FIGURE 1.

Finally the nuts were cut out by a tool 5, as represented in FIGURE 1e, then tapped internally by a known technique.

However it is to be realised that while nuts manufactured in accordance with the process which has just been described conformed with required standards, they possessed defects which could involve their breaking in use. In fact in the course of the compression effected as shown in FIGURE 1d, folds can be produced which are shown at C in FIGURE 1, these folds involving a defect in homogeneity in the metal of the barrel 1 and also involving risks of cracking. In any case, the described method of fabrication decreased the elasticity of the metal and this was most disadvantageous in view of the manner of tightening this nut as described in the aforementioned patent.

The process which has just been described further required the execution of numerous pressure-shaping operations, which had to be effected with an expensive tool comprising relatively fragile punches. Finally it should be noted that it was essential to use a metal capable of great elongation, such as that used for deep drawing operations, this metal being relatively expensive.

Thus the present invention has for its object a new process for the pressure-shaping of deformable self-locking nuts, such as those described in the aforementioned patent which process remedies the drawbacks which have just been indicated and further possesses various advantages.

According to the present invention the process is characterised in that there is used a metal plate or strip the thickness of which is equal to that of the barrel, the said plate being subjected to a first pressure-shaping operation in such fashion as to form the barrel; then a pressing operation is effected upon the part of the plate adjacent to the barrel in order to decrease the thickness of the said adjacent part, and finally a second pressure-shaping operation is effected in the course of which the part of reduced thickness is folded around the barrel in such fashion as to form the skirt, the nut thus produced then being cut from the plate or sheet of metal and then tapped.

Figure 2:
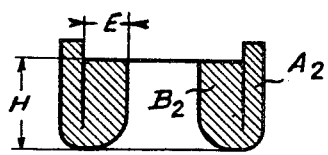

The invention will be better understood by reference to the accompanying drawing, wherein FIGURES 2a, 2b, 2c, 2d and 2e represent the various phases of production of a nut of the type represented by FIGURE 2, which is, of course, of the same type as that represented by FIGURE 1.

Referring to the drawing, it is seen that the starting material is a metal plate or strip 6, the thickness E of which is substantially equal to the thickness desired for the barrel $B_2$ as shown in FIGURE 2. In the course of a first pressure-shaping operation, a blank is produced like that represented in FIGURE 2a, then by means of a punch 7 acting in the direction F the spherical cap shown in FIGURE 2a is punched in such fashion that the blank shown in FIGURE 2b is obtained. The height of this blank is then equal to H, the height of the barrel $B_2$.

Figure 2C:
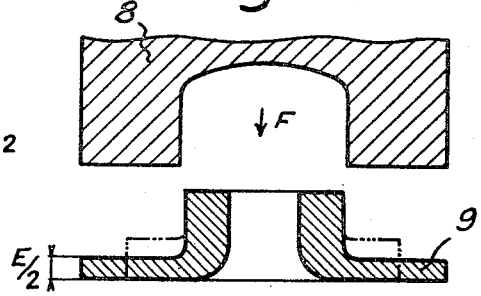
Figure 2A:
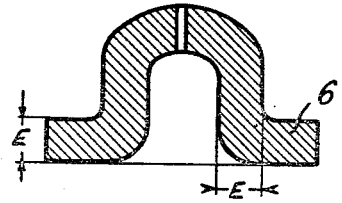

Then as shown in FIGURE 2c, the part 9 of the metal plate or strip adjacent to the vertical blank is pressed, with the aid of a punch of appropriate shape such as that represented at 8 in FIGURE 2c. The pressing is continued until the said adjacent part 9 is brought to a thickness of approximately one half of E.

Figure 2D:
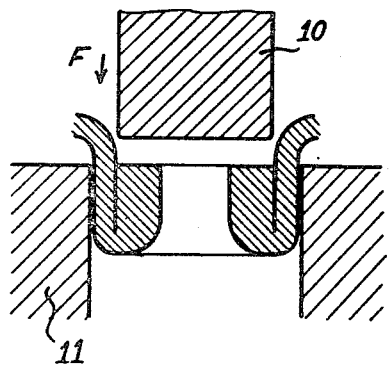
Figure 2B:
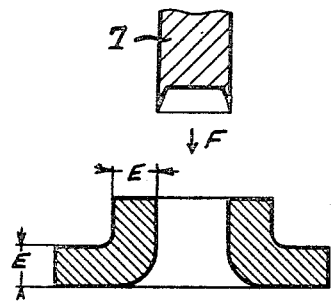

Then as shown in FIGURE 2d a second pressure-shaping operation is effected in the course of which the previously pressed part is folded around the barrel in such fashion as to constitute the skirt of the nut. This operation is carried out with the aid of a punch 10, the nut resting upon a die represented diagrammatically at 11 in FIGURE 2d.

Figure 2E:
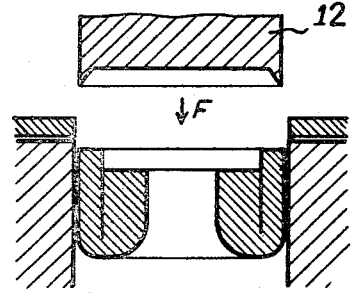

Finally as shown in FIGURE 2e, the nut is cut from the metal plate or strip with the aid of an appropriate punch 12 acting in the direction F, then tapped in a known machine (not shown).

It is quite evident that the conventional techniques of mass-production pressure-shaping can be applied in combination with the process according to the invention. In any case by virtue of this process it is possible to eliminate completely the drawbacks which were indicated above in the old technique of pressure-shaping of self-locking nuts. In fact the barrel $B_2$ is not deformed in the course of the various manufacturing phases and thus can retain sufficient elasticity to withstand suitable tightening. Furthermore the dangers of fracture are completely avoided.

It should further be noted that by reason of the compression of the metal of the part intended to constitute the skirt $A_2$ the strength of the latter is increased, making it thus better able to transmit its forces to the barrel $B_2$. It is also evident that the process according to the invention permits the use of presses of lower power and lighter and simpler construction than hitherto, and also of increasing the range of diameters of nuts producible by pressure-shaping. Finally it must be emphasized that it is no longer necessary to use a "deep drawing" metal, so that it is possible to reduce the cost of the nuts thus manufactured.

The invention is not of course limited to the embodiment which has just been described but on the contrary covers all variants thereof conforming with the spirit of the invention.

What I claim is:

1. A process for producing an integral deformable self-locking nut having a barrel portion and a skirt portion of substantially lesser thickness than said barrel portion reversely folded about said barrel portion in coaxial relation therewith, comprising the steps of pressure-shaping said barrel portion from a metal plate of substantially the same thickness as said barrel portion so that said barrel portion projects outwardly from said plate, subjecting the portion of said plate adjacent to said outwardly projecting barrel portion to a pressing operation to substantially reduce its thickness, and folding said adjacent portion of said plate of reduced thickness about said barrel portion so as to form said skirt portion.

2. A process as claimed in claim 1 wherein the thickness of said portion of said plate adjacent to said outwardly projecting barrel portion is reduced by approximately one-half.

3. A process as claimed in claim 1 wherein after folding said portion of said plate of said thickness about said barrel portion, said barrel portion is internally threaded.

References Cited by the Examiner
UNITED STATES PATENTS 1,990,718  2/35  Swanstrom _____ 10—86

ANDREW R. JUHASZ, *Primary Examiner.*